(12) United States Patent
Caksa

(10) Patent No.: US 8,282,119 B1
(45) Date of Patent: Oct. 9, 2012

(54) TWO-LEVEL TRAVEL STROLLER FOR CHILDREN

(76) Inventor: Kristina Caksa, East Brunswick, NJ (US)

( * ) Notice: Subject to any disclaimer, the term of this patent is extended or adjusted under 35 U.S.C. 154(b) by 858 days.

(21) Appl. No.: 12/317,519

(22) Filed: Dec. 24, 2008

Related U.S. Application Data

(60) Provisional application No. 61/008,850, filed on Dec. 26, 2007.

(51) Int. Cl.
*B62B 7/06* (2006.01)

(52) U.S. Cl. .......................... 280/642; 280/647

(58) Field of Classification Search ................. 280/642, 280/647, 648, 47.38, 47.39, 47.4
See application file for complete search history.

(56) References Cited

U.S. PATENT DOCUMENTS

| | | | |
|---|---|---|---|
| 5,184,835 A | 2/1993 | Huang | |
| 5,653,460 A * | 8/1997 | Fogarty | 280/642 |
| 6,070,890 A * | 6/2000 | Haut et al. | 280/47.38 |
| D429,476 S | 8/2000 | Gehr | |
| D430,076 S | 8/2000 | Gehr | |
| 6,099,022 A * | 8/2000 | Pring | 280/648 |
| 6,152,340 A * | 11/2000 | Chen et al. | 224/409 |
| 6,267,406 B1 | 7/2001 | Hunag | |
| 6,302,412 B1 * | 10/2001 | Worth et al. | 280/30 |
| D455,679 S | 4/2002 | Tai et al. | |
| 6,398,233 B1 * | 6/2002 | Liang et al. | 280/30 |
| 6,409,205 B1 * | 6/2002 | Bapst et al. | 280/642 |
| 6,446,990 B1 * | 9/2002 | Nania et al. | 280/47.371 |
| D465,754 S | 11/2002 | Huang | |
| 6,626,452 B2 * | 9/2003 | Yang et al. | 280/643 |
| 6,679,506 B2 * | 1/2004 | Koppes et al. | 280/47.34 |
| 6,863,286 B2 * | 3/2005 | Eros et al. | 280/47.38 |
| 6,935,652 B2 | 8/2005 | Fair et al. | |
| 7,017,921 B2 * | 3/2006 | Eros | 280/47.38 |
| 7,464,957 B2 * | 12/2008 | Worth et al. | 280/642 |
| 7,475,900 B2 * | 1/2009 | Cheng | 280/642 |
| 7,497,461 B2 * | 3/2009 | Emerson | 280/642 |
| 7,694,996 B2 * | 4/2010 | Saville et al. | 280/642 |
| 7,938,435 B2 * | 5/2011 | Sousa et al. | 280/658 |
| 8,033,555 B2 * | 10/2011 | Mostert et al. | 280/47.38 |
| 8,100,429 B2 * | 1/2012 | Longenecker et al. | 280/642 |

* cited by examiner

*Primary Examiner* — Jeffrey J Restifo
(74) *Attorney, Agent, or Firm* — Montgomery Patent & Design, LLC; Robert C. Montgomery; Joseph Yaksich

(57) ABSTRACT

A collapsible child stroller system with a means for attaching an infant carrier at an upper location along with a second child at a lower position occupying a typical front facing seat, is herein disclosed. The infant carrier comprises a molded plastic seat that is attachable thereto an upper frame portion of the stroller. The stroller system may also be reconfigured to allow an infant occupying the upper position to sit facing the caregiver in a similar manner as a grocery cart. The child stroller system provides enhancements such as removable and washable padded cloth padding, a cup holder, and snack trays at upper and lower locations. When the infant carrier is attached to the upper stroller frame, an infant can be safely transported on the same stroller with a second child. The second child would sit facing forward on the lower portion similar to most existing child strollers.

17 Claims, 6 Drawing Sheets

TWO-LEVEL TRAVEL STROLLER FOR CHILDREN

RELATED APPLICATIONS

The present invention was first described in U.S. Provisional Patent Application No. 61/008,850 filed on Dec. 26, 2007, the entire disclosures of which are incorporated herein by reference.

FIELD OF THE INVENTION

The present invention relates generally to two-level travel stroller for transporting up to two (2) children thereon, comprising an adjustable lower child seat and an upper portion convertible between an upper infant carrier means and an upper sitting means.

BACKGROUND OF THE INVENTION

Toddlers and infants are frequently transported in child strollers. Designed for use with newborns up to children five (5) years or older, the stroller serves as a wonderful method of keeping the child from wandering off and providing a convenient location for a child to rest. Most strollers are typically useful for one child, and consequently are limited use for families with multiple children. Additionally, the stroller places the child facing away from the parent, which can be a frightful experience for some children who must constantly turn around to check if their parent or care provider is still there. Accordingly, there exists a need for a means by which strollers can be equipped to address the deficiencies identified above. The development of the invention herein described fulfills this need.

There have been attempts in the past to invent multiple passenger children's strollers. U.S. Pat. No. 6,935,652 issued to Fair et al. discloses a tandem stroller with side entry and associated fold actuator comprising a folding frame type tandem stroller with a side step and a side portion of the folding frame is configured to provide a side access region to the rear seat. Unfortunately, this patent does not appear to disclose a two-level travel stroller that is capable of receiving a commercially available infant carrier while transporting another child at the same time.

U.S. Pat. No. 6,267,406 issued to Huang discloses a folding-collapsible double-seat baby stroller comprising a front seat mounted on the front side of the bottom frames, a rear seat mounted on the rear side of the bottom frames above the elevation of the front seat, and a locking mechanism adapted to lock the handle and the support frames. Unfortunately, this patent does not appear to disclose a two-level travel stroller that comprises a horizontal platform that is capable of receiving and securing an infant carrier.

U.S. Pat. No. 6,099,022 issued to Pring discloses a convertible multi-function stroller that comprises a removable seat. Unfortunately, this patent does not appear to disclose a two-level travel stroller that is capable of transporting two (2) children.

U.S. Pat. No. 5,653,460 issued to Fogarty discloses a child stroller that is capable of transporting two (2) children that comprises six (6) wheels and a frame structure that supports an infant in a backpack type of carrier. Unfortunately, this patent does not appear to disclose a two-level travel stroller that comprises a horizontal platform for accepting a removable infant carrier, nor does it appear to be designed to provide an infant carrier that is positioned above the second child.

U.S. Pat. No. 5,184,835 issued to Huang discloses a handle height adjuster for baby carriage. Unfortunately, this patent does not appear to disclose a two-level travel stroller for children that provides the ability to transport two (2) children at one (1) time in the same stroller.

U.S. Pat. No. D 465,754 issued to Huang discloses a double-seat stroller that appears to comprise one (1) seat located in front of the other. Unfortunately, this design patent does not appear to be similar in appearance to the disclosed apparatus, nor does it appear to disclose a two-level travel stroller that permits the placement of an infant carrier on a horizontal platform in such a manner that the infant is able to view the caregiver at all times.

U.S. Pat. No. D 455,679 issued to Tai et al. discloses a double seat pedicab. Unfortunately, this design patent does not appear to be similar in appearance to the disclosed apparatus, nor does it appear to disclose a two-level travel stroller that permits the placement of an infant carrier on a horizontal platform in such a manner that the infant is able to view the caregiver at all times.

U.S. Pat. No. D 430,076 issued to Suttle discloses a two-level stroller that appears to comprise an infant carrier mounted above a conventional stroller seat. Unfortunately, this design patent does not appear to be similar in appearance to the disclosed apparatus, nor is it clear whether the Patent describes a carrier that is removable attachable to the stroller.

U.S. Pat. No. D 429,476 issued to Gehr discloses a dual stroller that appears to be two infant carriers located on in front of the other. Unfortunately, this patent does not appear to be similar in appearance to the disclosed apparatus, nor does this patent appear to comprise a removable infant carrier located above a conventional child carrier seat.

SUMMARY OF THE INVENTION

In light of the disadvantages as previously discussed in the prior art, it is apparent that there is a need for a two-level travel stroller for children which provides a collapsible child stroller system.

It is an object of the two-level travel stroller is to provide a collapsible stroller that is similar in width to a conventional single passenger unit while providing a means for attaching a standard infant carrier along with an infant being seated in a typical front facing child seat.

Another object of the two-level travel stroller is to provide a detachable infant carrier that when detached provides access to a sitting platform allowing an infant or child to occupy a sitting position facing a caregiver.

A further object of the two-level travel stroller comprises a manufacture of rugged plastic and metal components and provided in a variety of colors and patterns.

Still another object of the two-level travel stroller provides the ability to accept a commercially available infant carrier on the upper portion of the stroller thereby permitting an infant to be safely transported on the same stroller with a second infant or child.

Still a further object of the two-level travel stroller comprises an umbrella to protect the seated infant from sunlight and other weather elements.

Yet another object of the two-level travel stroller comprises a "U"-shaped push handle further comprising common convenience features including a cup holder, an upper tray, and one (1) or more accessory hooks.

An aspect of the two-level travel stroller comprises a stroller frame, a pair of locking bars, a lower child seat, a foot rest, a bumper bar, a lower tray, a cup holder, an accessory hook, and an upper tray.

Another aspect of the two-level travel stroller comprises a stroller frame comprising collapsible folding tubular assembly and further comprising a pair of locking bars. Each locking bar comprises a pair of scissor-like metal bars provides a similar function as a conventional card-table leg locking mechanism.

A further aspect of the two-level travel stroller comprises an adjustable lower child seat comprising a pair of expansion sections, a pair of seat brackets, a pair of adjustment pins, and a plurality of adjustment apertures. The seat brackets comprise integral ear-shaped sewn-in portions that are in mechanical communication with rearward stroller frame portions via a plurality of adjustment apertures. The adjustment apertures are sized and positioned so as to receive respective adjusting pins. The lower child seat and stroller frame portions provide an attachment means to an adjustable foot rest, front bumper bar, and a lower tray.

Still another aspect of the two-level travel stroller comprises a bumper bar comprising a "U"-shaped tubular member with a sanitary washable covering. The bumper bar provides an attachment means to a lower tray and also comprises a foot rest that with a semi-rigid protective plastic panel.

Still a further aspect of the two-level travel stroller comprises four (4) wheels and a rear-mounted braking system. The wheels comprise a wheel axle further comprising an axle housing and a braking system, a first brake bracket, a second brake bracket, a first brake pedal, a second brake pedal, and a pair of friction surfaces.

Yet another aspect of the two-level travel stroller comprises an axle housing that provides a tubular enclosure means to the wheel axle. The axle housing provides an attachment means to the brake brackets which provide a rotating attachment means to respective brake pedals.

Yet still another aspect of the two-level travel stroller comprises a carrier platform comprising a taut horizontal surface that is permanently affixed to said stroller frame. The carrier platform comprises a washable padded plastic covering, an adjustable lower seat belt harness, and a lower harness buckle.

Yet still another aspect of the two-level travel stroller comprises a "U"-shaped push handle further comprising common convenience features including a cup holder, an upper tray, and one (1) or more accessory hooks affixed to adjacent stroller frame members.

Yet still a further aspect of the two-level travel stroller comprises a sitting platform, a crotch strap, a carrier platform, a platform fastener, and a platform slot. The sitting platform provides an attachment means to the crotch strap and comprises a suspended horizontal surface made using a textile of extruded plastic panel being stationarily-mounted to the stroller frame members.

Yet another aspect of the two-level travel stroller comprises a pair of umbrella receptacles, a pair of locking bar side pads, and an umbrella. The locking bar side padding provides an additional safety means to the occupying child. The umbrella receptacles comprise vertical tubular apertures each comprising a particularly sized inside diameter so as to insertingly receive the umbrella handle portion of an umbrella.

A method of utilizing the two-level travel stroller may be achieved by performing the following steps: expanding the stroller frame from a collapsed state to a fully deployed state by extending the elements of said stroller frame outwardly until reaching mechanical limits of said stroller frame; securing the stroller frame in a deployed state using the locking bars by manually pressing the locking bars to a latched horizontal position; adjusting particular elements of the lower child seat such as the adjustable seat brackets and any other equipped adjustable features to desired positions based upon an anticipated position and size of an infant occupying the lower child seat; configuring the system to receive an infant carrier by placing the infant carrier upon the carrier platform; securing the infant carrier to an upper portion of the stroller frame using the handle member portion of the infant carrier and a plurality of fastening means; loading one (1) or two (2) children/infants into the system; utilizing the cup holder, upper tray, and accessory hook as desired; transporting said children using the push handle as needed; configuring the system to facilitate a seated child upon by removing the infant carrier from the system by detaching the fasteners from the handle member portion of the infant carrier; installing the locking bar side padding to the locking bars using the hook-and-loop fasteners; utilizing the sitting platform by loading a child into a seated position facing a rearward direction; inserting the umbrella handle into an umbrella receptacle to protect the children from weather elements; transporting said children using the push handle as needed; and, benefiting from a configurable two-passenger stroller while enjoying the secure maneuverability of the present invention.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

| DESCRIPTIVE KEY | |
|---|---|
| 10 | two-level travel stroller for children |
| 20 | stroller frame |
| 21 | wheel |
| 22 | push handle |
| 24 | pivoting attachment mechanism |
| 25 | umbrella receptacle |
| 26 | end cap |
| 28 | locking bar |
| 30 | lower child seat |
| 31 | expansion section |
| 32 | bumper bar |
| 33 | lower harness |
| 34 | lower tray |

-continued

DESCRIPTIVE KEY

| | |
|---|---|
| 35 | lower harness buckle |
| 37 | seat bracket |
| 38 | adjustment pin |
| 39 | adjustment aperture |
| 40 | umbrella |
| 42 | umbrella handle |
| 45 | sitting platform |
| 46 | upper harness |
| 47 | crotch strap |
| 48 | upper harness buckle |
| 49 | side padding |
| 50 | carrier platform |
| 51 | fastening means |
| 52 | platform strap |
| 54 | platform fastener |
| 56 | platform slot |
| 60 | upper tray |
| 62 | cup holder |
| 64 | accessory hook |
| 100 | infant carrier |
| 105 | handle member |
| 110 | wheel axle |
| 112 | first brake bracket |
| 114 | second brake bracket |
| 116 | first brake pedal |
| 118 | second brake pedal |
| 120 | friction surface |

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a two-level travel stroller for children (herein described as the "system") 10, which provides a collapsible child stroller system providing a similar overall width as a conventional single passenger unit while providing a means for attaching a standard infant carrier 100 at an upper position along with an infant being seated in a typical front facing child seat 30 at a lower position. The infant carrier 100 may be detached to provide access thereto a sitting platform 45, thereby allowing an infant or child to occupy a sitting position facing a caregiver.

Figure 1:
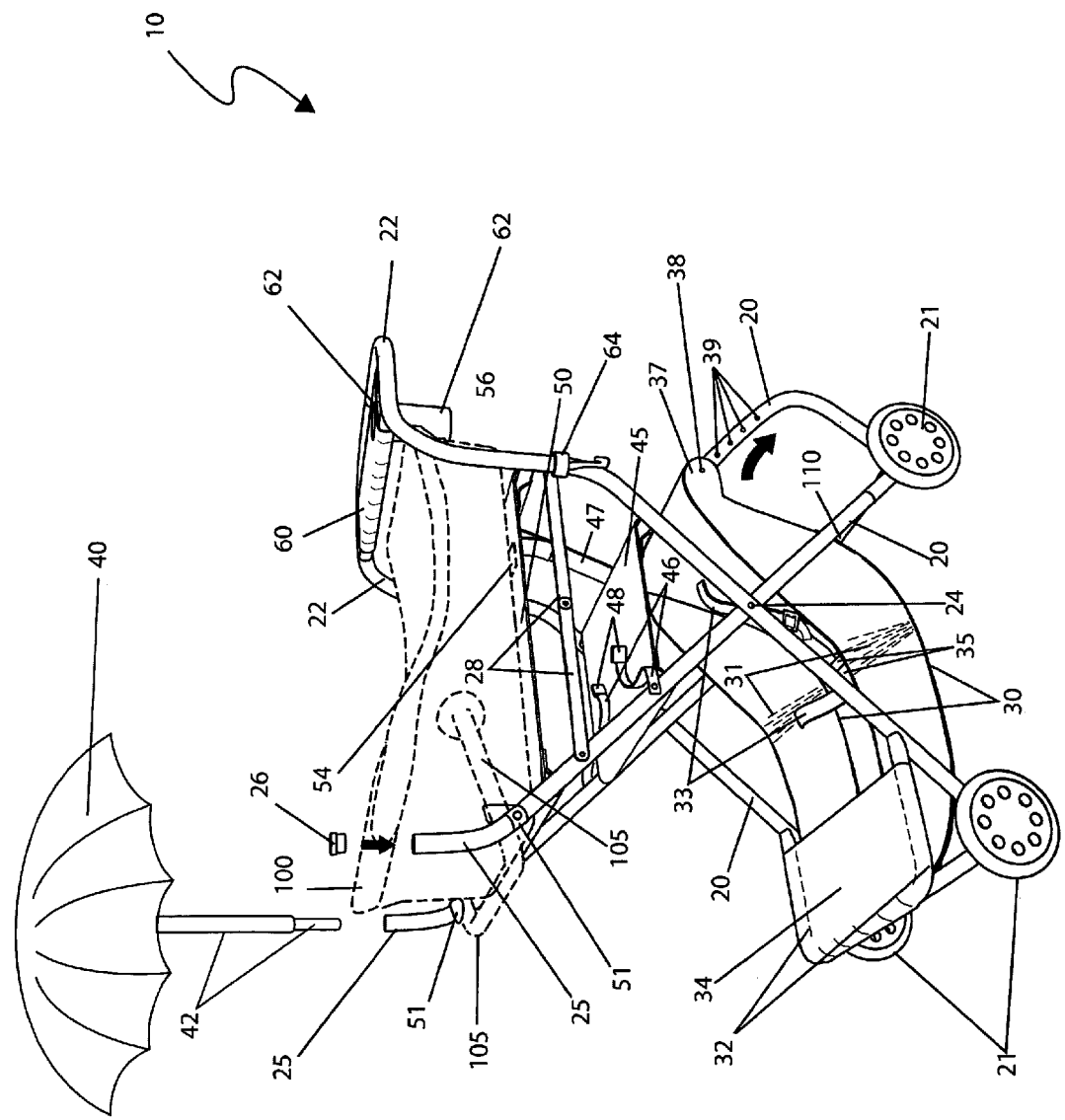
FIG. 1 is a side perspective view of a two-level travel stroller for children 10 being configured to receive an infant carrier 100, according to a preferred embodiment of the present invention.
Figure 2A:
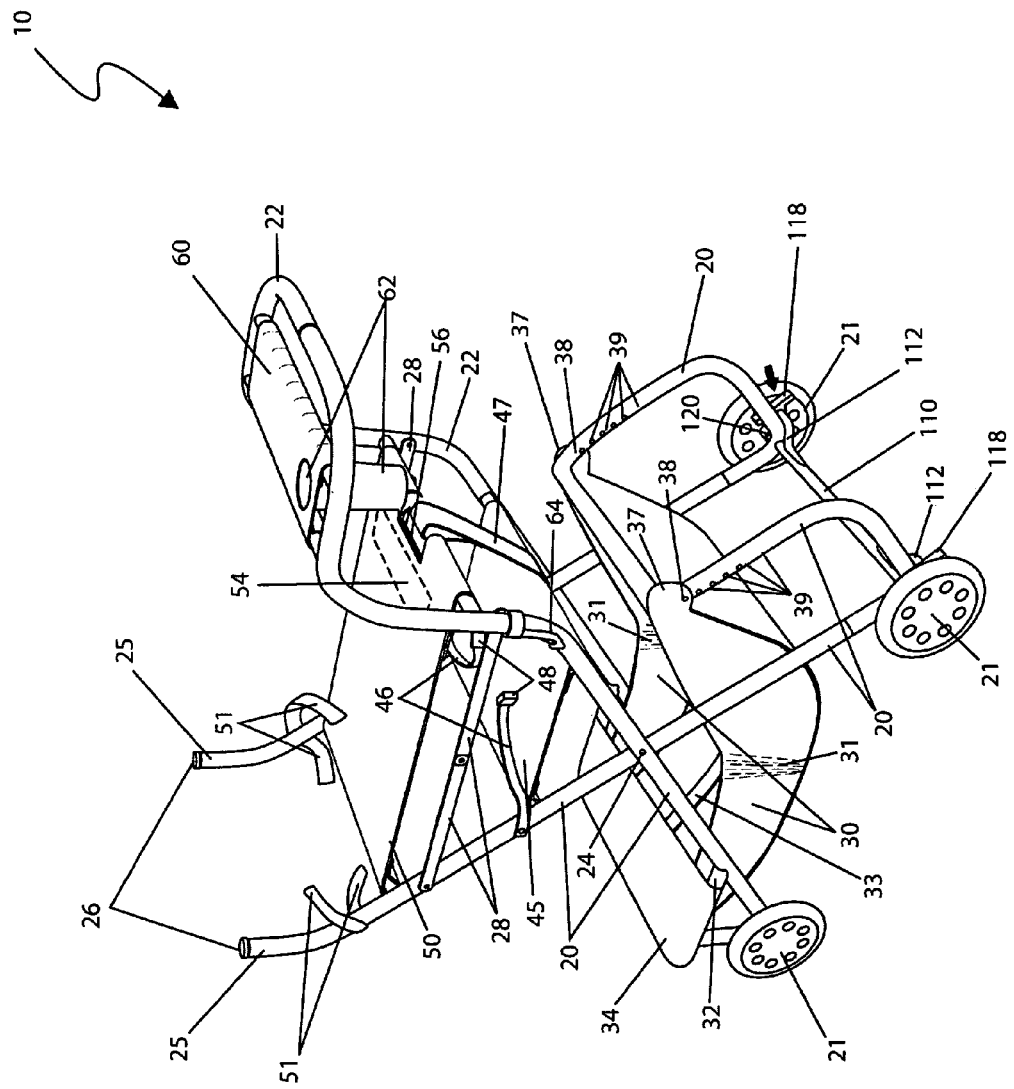
FIG. 2a is a rear perspective view of a two-level travel stroller for children 10 being configured to receive an infant carrier 100, according to a preferred embodiment of the present invention.

Referring now to FIGS. 1 and 2a, a side perspective and a rear perspective view of the system 10 being configured to receive an infant carrier 100, according to the preferred embodiment of the present invention, are disclosed. The system 10 comprises a stroller frame 20, a pair of locking bars 28, a lower child seat 30, a bumper bar 32, a lower tray 34, a cup holder 62, an accessory hook 64, and an upper tray 60. The system 10 comprises rugged plastic and metal components envisioned to be finished or molded therein a variety of colors and patterns commonly associated therewith popular baby strollers based upon marketing and user preferences.

The stroller frame 20 comprises a collapsible folding tubular assembly similar to conventional folding strollers providing expected elements such as, but not limited to: four (4) standard wheels 21, a horizontally extending push handle 22, a plurality of pivoting attachments 24, various tubular joining fixtures, protective plastic end caps 26, and the like. The stroller frame 20 is envisioned to be made using rugged light-weight tubular shapes made using such materials as aluminum, steel, or plastic providing a compact folding means for easy collapsed transport and storage (see FIG. 5). The stroller frame 20 further provides a pair of locking bars 28 along outside upper members to secure the stroller frame 20 thereinto a fully deployed state. Each locking bar 28 comprises a pair of scissor-like metal bars being joined thereto one another via a rotating fastener and integral horizontal stop mechanism, thereby providing a similar function as a conventional card-table leg locking mechanism. The locking bar 28, when manipulated to expand said stroller frame 20, forms a single in-line member, thereby securing the stroller frame 20 in a deployed state in a typical fashion.

The stroller frame 20 provides an attachment means thereto an adjustable lower child seat 30 being permanently attached thereto using common fasteners such as, but not limited to: rivets, screws, snaps, hook-and-loop strapping, or the like. The lower child seat 30 provides a reclined and adjustable back support means providing graduated and locking reclined positions via a pair of expansion sections 31, a pair of seat brackets 37, a pair of adjustment pins 38, and a plurality of adjustment apertures 39. The seat brackets 37 comprise integral ear-shaped sewn-in portions of the lower child seat 30 being located along opposing upper rear edge regions. Said seat brackets 37 are in mechanical communication therewith rearward stroller frame portions 20 via a plurality of adjustment apertures 39 arranged therealong outer surfaces of said stroller frame portions 20. Said adjustment apertures 39 are sized and positioned so as to receive respective adjusting pins 38 therethrough both the seat brackets 37 and the tubular stroller frame members 20, thereby securing the lower child seat 30 thereat a particular reclined angle ranging from a sitting to a lying position in an expected manner. The expansion sections 31 are located at intermediate opposing positions along side portions of the lower child seat 30. The expansion sections 31 comprise expandable textile or rubber panels providing flexible regions, thereby compensating for a difference in seating angles of said lower child seat 30. The adjusting pins 38 are envisioned to comprise common hardware items such as quick-disconnect pins, ball lock pins, knobs with studs, or the like.

The lower child seat 30 comprises a lower than normal height thereto a ground surface as compared to conventional strollers, thereby allowing attachment of an additional infant carrier 100 thereabove said lower child seat 30 thereat an acceptable elevation and center of gravity. When the infant carrier 100 is attached thereto the stroller frame 20, an infant may be safely transported on the same stroller 20 with a second infant or child. Additionally, the lower child seat 30 and stroller frame portions 20 provide an attachment means thereto a front bumper bar 32 and a lower tray 34. The bumper bar 32 is to be located at a forward location thereto the lower child seat 30. The bumper bar 32 comprises a "U"-shaped tubular member having a sanitary washable finish being made using light-weight tubular materials similar to the stroller frame 20. The bumper bar 32 provides an attachment means thereto the lower tray 34 affixed thereto along upper surfaces using common fasteners and forming a convenient horizontal table area being generally superjacent thereto the front wheels 21. The lower child seat 30 is envisioned to provide expected stroller features such as, but not limited to: a washable padded plastic surface covering, an adjustable lower seat belt harness 33, and a lower harness buckle 35.

The system 10 further comprises four (4) wheels 21 and a rear mounted braking system. The wheels 21 are located at each corner of the system 10 in an expected manner comprising a sufficient load-bearing capability to support anticipated extra loads therefrom two (2) children, the infant carrier 100, and other personal items. The wheels 21 are envisioned to comprise a rubberized tread portion so as to provide safe smooth transportation of the system 10 over both smooth and rough surfaces. The rear pair of wheels 21 are joined via a horizontal interconnecting metal wheel axle 110 being affixed thereto at a center location of the wheels 21 using conventional metal joining processes. The wheel axle 110 further comprises an axle housing 111 and a braking system further comprising a first brake bracket 112, a second brake bracket 114, a first brake pedal 116, a second brake pedal 118, and a pair of friction surfaces 120. The axle housing 111 provides a tubular enclosure means thereto the wheel axle 110 being affixed therebetween adjacent stroller frame portions 20. The axle housing 11 provides an attachment means thereto the brake brackets 112, 114 which extend therefrom in an outward direction and provide a rotating attachment means thereto respective brake pedals 116, 118. Said brake pedals 116, 118 operate individually in a toggling manner allowing one (1) or both brake pedals 116, 118 to be rotatingly motioned by a user using his/her foot to activate and release a braking action. While in an activated state, one (1) or both brake pedals 116, 118 are pressed downwardly along a bottom portion thereof, thereby causing contact therewith an integral rubberized or textured friction surface portion 120 of the wheel axle 110. Contact therebetween the brake pedal 116, 118 and the respective friction surface 120 precludes rotation of the wheel axle 110, thereby holding the stroller system 10 at a stationary position. Release of the brake pedal 116, 118 and subsequent system 10 is accomplished by contacting an upper portion of said brake pedal 116, 118 with one's foot to rotatingly motion said brake pedal 116, 118 upwardly, thereby eliminating contact therewith said friction surface portion 120 of the wheel axle 110.

The system 10 is designed to utilize, support, and secure a commercially available infant carrier 100 thereto the upper portion of the stroller frame 20 via a horizontal carrier platform 50 and a plurality of fastening means 51. The infant carrier 100 is envisioned to provide common features including a side-mounted wrap-around handle member 105. The carrier platform 50 comprises a taut horizontal surface made using a textile or extruded plastic panel being extended in a forward and rearward direction along a horizontal plane. Said carrier platform 50 is permanently affixed thereto said stroller frame 20 along a forward edge using common fasteners such as rivets, screws, or the like, and removably attached thereto a rearward member of the stroller frame 20 using preferably a hook-and-loop fastening means 54 (see FIG. 2*b*).

While in a horizontal orientation, the handle member 105 provides a removably attachable means thereto upper stroller frame portions 20 of the system 10 utilizing a plurality of common fastening means 51 such as hook-and-loop straps, straps and buckles, plastic clips, or the like to secure the child carrier 100 safely thereto.

The stroller frame 20 further comprises an upper rearward extending "U"-shaped push handle 22 further comprising common convenience features including a cup holder 62, an upper tray 60, and one (1) or more accessory hooks 64 affixed thereto adjacent stroller frame members 20. The cup holder 62 and upper tray 60 are envisioned being incorporated therein the push handle portion 22 in an integral manner at a location convenient thereto a user. The accessory hooks 64 may be affixed at various positions thereto said stroller frame 20 using common fasteners allowing a secure attachment means thereto personal items such as a diaper bag, a purse, or the like.

Figure 2B:
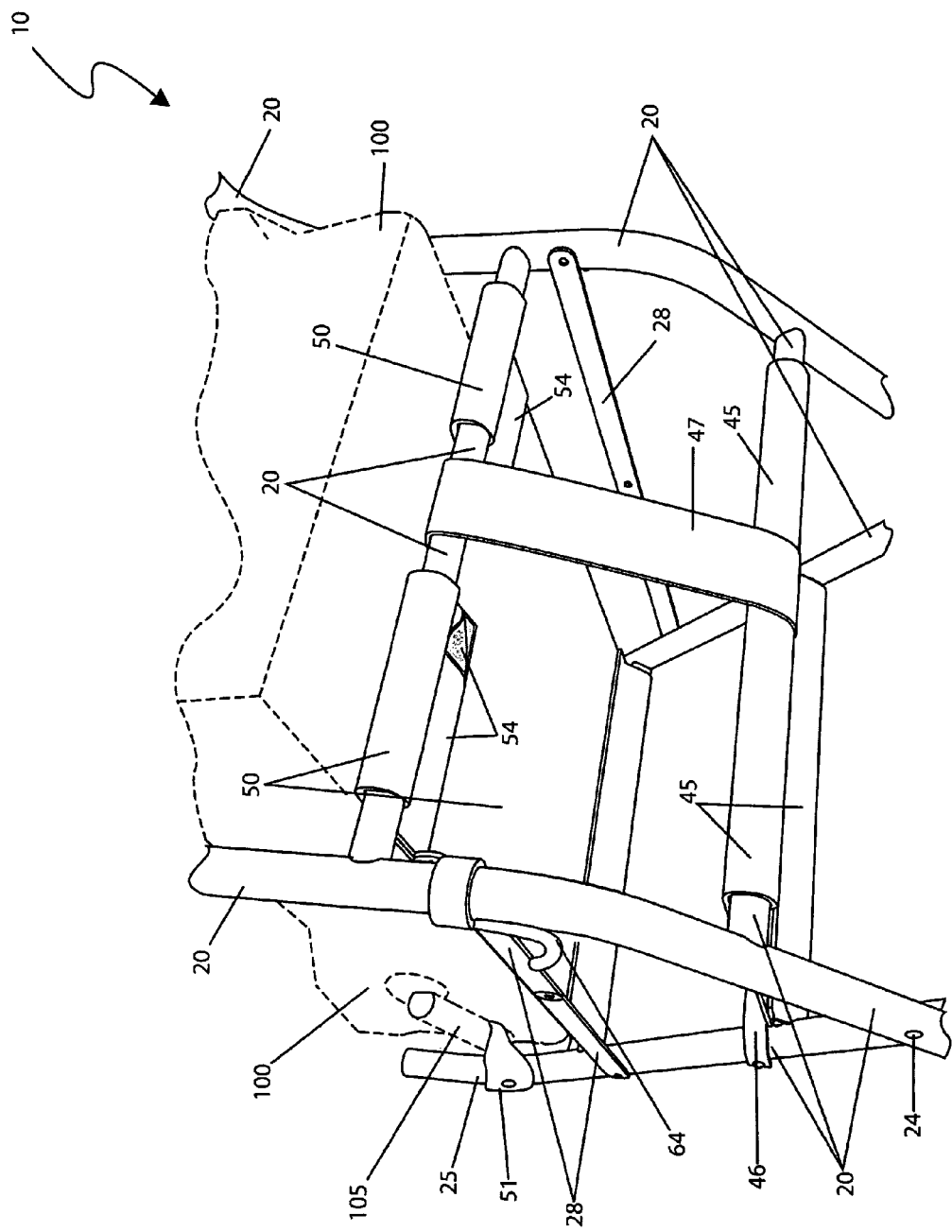
FIG. 2b is an upward looking close-up view of carrier platform portion 50 of a two-level travel stroller for children 10, according to a preferred embodiment of the present invention.

Referring now to FIG. 2*b*, an upward looking close-up view of carrier platform portion 50 of the system 10, according to a preferred embodiment of the present invention, is disclosed. The system 10 comprises a sitting platform 45, crotch strap 47, carrier platform 50, a platform fastener 54, and a platform slot 56. The sitting platform 45 provides an attachment means thereto the crotch strap 47 via conventional sewn-in textile assembly techniques. Said crotch strap 47 extends therefrom in an upward direction being permanently affixed thereto a rear horizontal stroller frame portion 20 in a coincidental manner therewith the carrier platform 50. When the system 10 is configured in the child carrier 100 mode (as seen here), the carrier platform 50 is to be coincidentally affixed thereto said stroller frame member 20 via a pair of platform fasteners 54 comprising preferably of wide hook-and-loop fastener regions sewn thereinto said carrier platform 50 and being wrapped around and attached thereto said carrier platform 50 along a bottom surface; however, it is understood that various other fastening means may be utilized such as snaps, clips, or the like with equal benefit. Due to the coincidental attachment of the carrier platform 50 and crotch strap 47 thereto the stroller frame member 20, the carrier platform 50 further comprises a clearance means thereto the crotch strap 47 via a platform slot 56 which comprises a rectangular cut out portion suitable in size so as to allow clearance of said crotch strap 47 therethrough. When configured in a seated child state, said carrier platform 50 is released therefrom the stroller frame 20 by detachment of said platform fasteners 54 and secured thereto a stored position (see FIG. 3).

Figure 3:
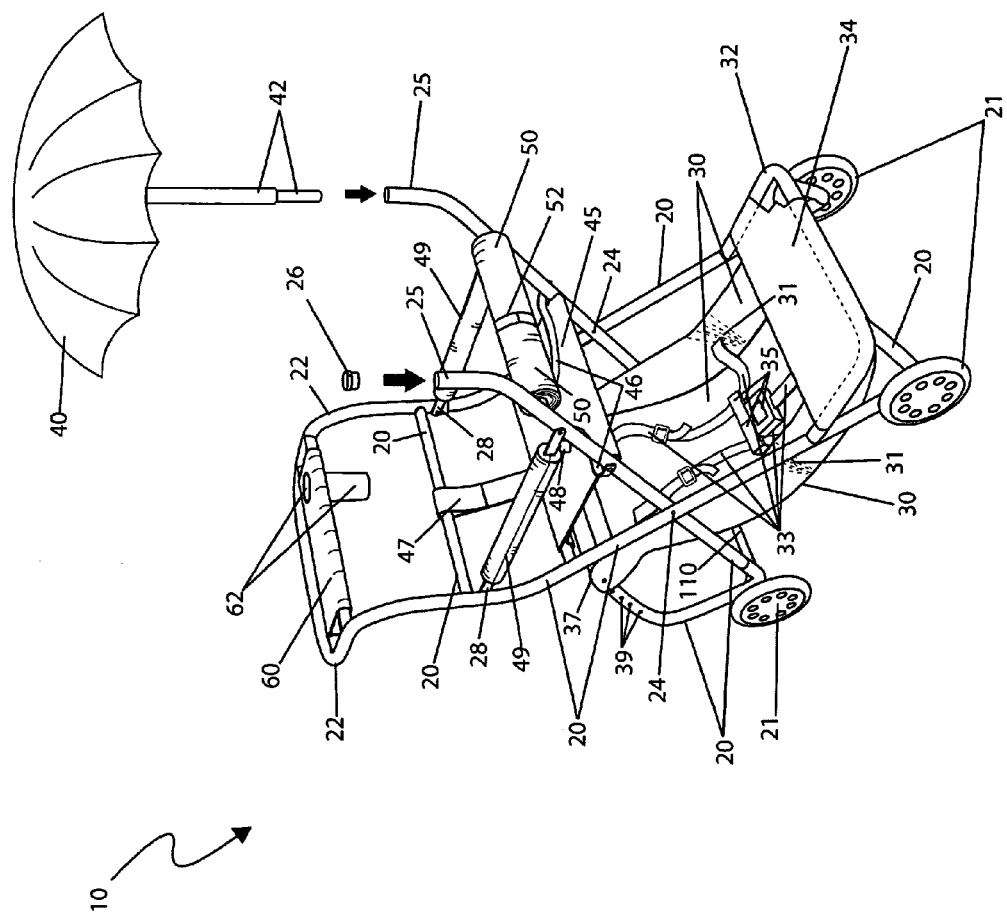
FIG. 3 is a side perspective view of a two-level travel stroller for children 10 depicting a sitting platform 45 configuration, according to a preferred embodiment of the present invention.
Figure 4:
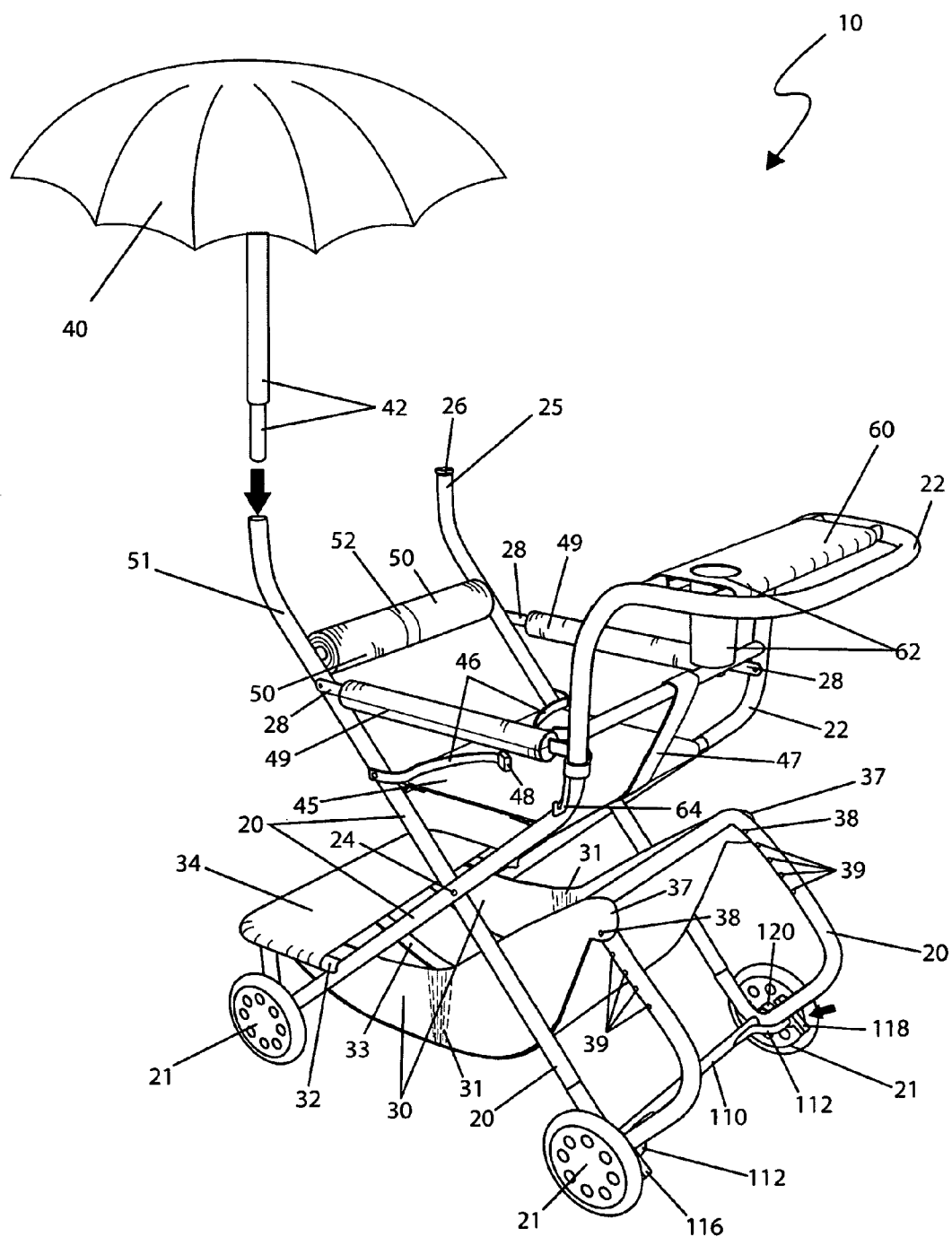
FIG. 4 is a rear perspective view of a two-level travel stroller for children 10 depicting a sitting platform 45 configuration, according to a preferred embodiment of the present invention; and, FIG. 5 is a perspective view of the two-level travel stroller for children 10 depicting a folded state, according to a preferred embodiment of the present invention.

Referring now to FIGS. 3 and 4, a side perspective and rear perspective view of the system 10 depicting a sitting platform 45 configuration, according to the preferred embodiment of the present invention, are disclosed. The system 10 as depicted here, is configured so as to facilitate a seated child thereat an upper portion of the system 10 in lieu of the previously described infant carrier 100 and suspended carrier platform 50. The system 10 as configured here comprises a pair of umbrella receptacles 25, a pair of locking bar side pads 49, an umbrella 40, a sitting platform 45, a crotch strap 47, and a platform strap 52. The system 10 is shown here with the infant carrier 100 removed, thereby allowing the upper portion of the system 10 to be utilized by an infant or small child in a seated position facing a care giver. The push handle 22, sitting platform 45, locking bars 28, and the surrounding stroller frame portions 20 provide a stable and safe enclosure means therearound the seated infant in a similar manner as a conventional grocery cart. In this configuration, the carrier platform portion 50 of the system 10 is detached therefrom the rearward stroller frame member 20 and rolled therearound a forward stroller frame member 20 and secured thereto using a platform strap 52 comprising preferably of a sewn-in length of hook-and-loop strapping affixed thereto an edge portion of said carrier platform 50. When rolled and secured, the carrier platform acts to provide a padded safety barrier therebehind the child as seen here.

The locking bar side padding 49 provides an additional safety means thereto the occupying child being wrapped around each locking bar portion 28, thereby providing further padding thereto the infant. The locking bar side padding 49 comprises a washable plastic coated surface over a urethane foam core and is to be removably attached thereto the side-mounted locking bars 28. Said locking bar side padding 49 comprises a pair of padded rectangular shapes which when wrapped around said locking bars 28 each form a cylindrical shape having a linear seam along an entire bottom surface being affixed thereto using a common fastening means such as prong-snaps, hook-and-loop straps, or the like. The crotch strap 47 comprises a vertical length of textile strapping permanently affixed thereto rearward members of the stroller frame 20 using common fasteners, thereby providing a conventional leg orientation means thereto the occupying child in a similar manner as a conventional grocery cart. The sitting platform 45 comprises a suspended horizontal surface made using a textile of extruded plastic panel being stationarily-mounted thereto stroller frame members 20 using common fasteners such as rivets, screws, or the like, thereby providing a secure seating area thereto the infant. The sitting platform 45 may provide expected features such as, but not limited to: a washable padded plastic surface, an adjustable upper seat belt harness 46, an upper harness buckle 48, and the like.

Mounted thereto a forward upper member of the stroller frame 20, are a pair of upwardly extending umbrella receptacles 25. Said umbrella receptacles 25 comprise vertical tubular apertures each comprising a particularly sized inside diameter so as to insertingly receive an umbrella handle portion 42 of the umbrella 40 therein. The umbrella receptacles 25 are positioned at right and left forward corner locations of the stroller frame 20, thereby providing positional configuration of the umbrella 40 based upon wind conditions, sun position, and the like during use. The umbrella 40 is envisioned to provide a standard protective round or ovular canopy having sufficient height, diameter, and waterproof properties so as to protect the seated infant from sunlight and other weather elements in an expected manner. It is further understood that the umbrella receptacles 25 and umbrella 40 may be equally utilized thereby the system 10 when configured for an infant carrier 100 or a seated child.

Figure 5:
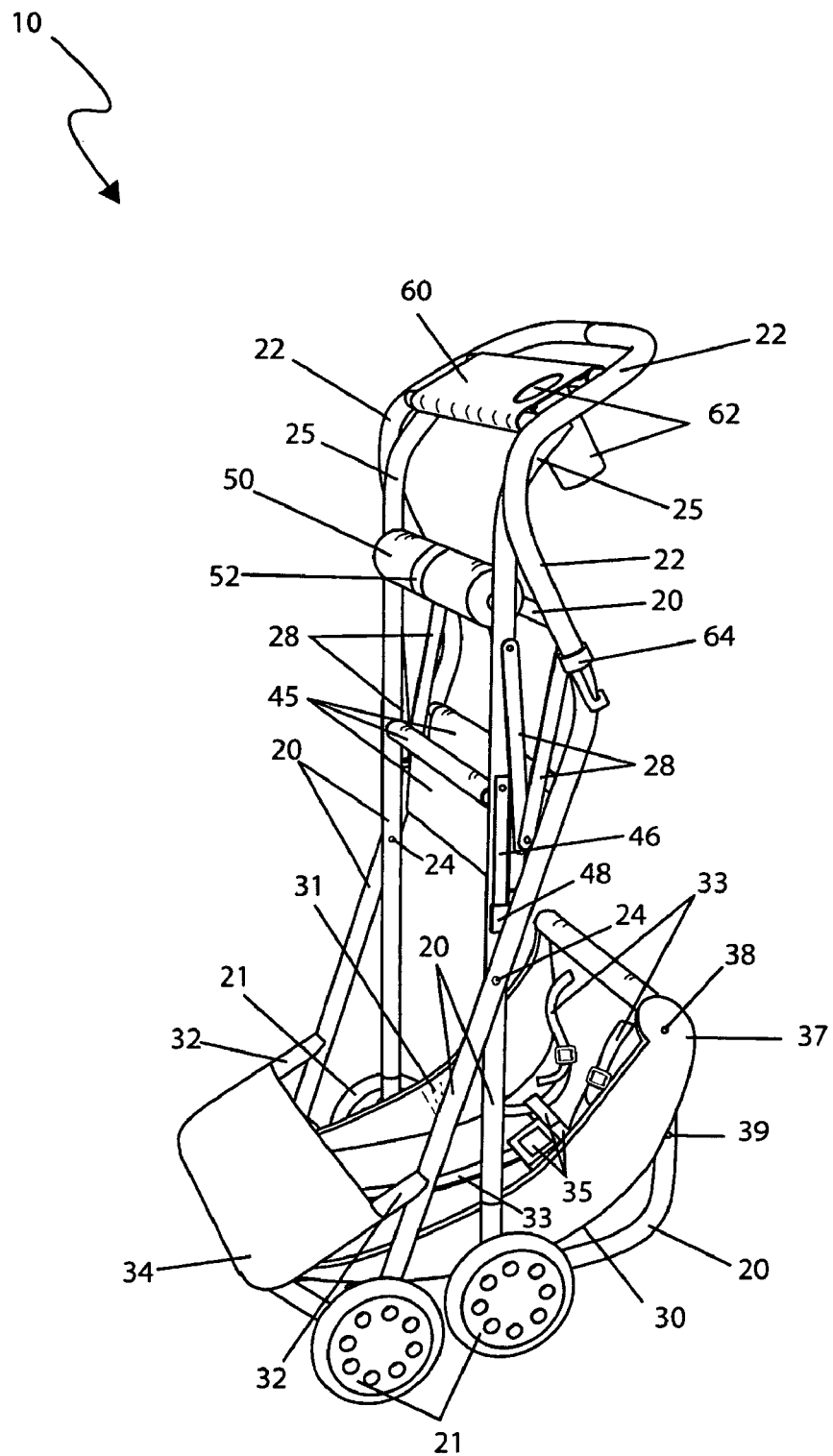

Referring now to FIG. 5, a perspective view of the two-level travel stroller for children 10 depicting a folded state, according to a preferred embodiment of the present invention, is disclosed. The apparatus 10 provides a compact folding means for convenient transportation and storage thereof. The folding and collapsing of the apparatus 10 is enabled by simultaneously folding both locking bars 28 downwardly, thereby allowing stroller frame portions 20 to pivot therearound the pivoting attachment mechanisms 24 resulting in a reduced configuration. When in the folded state, the apparatus 10 may be stored therewithin a vehicle trunk, closet, or the like.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be utilized and configured as indicated in FIGS. 1 through 5.

The method of utilizing the system 10 may be achieved by performing the following steps: expanding the stroller frame 20 therefrom a collapsed state to a fully deployed state by extending the elements of said stroller frame 20 outwardly until reaching mechanical limits of said stroller frame 20; securing the stroller frame 20 in a deployed state using the locking bars 28 by manually pressing the locking bars 28 thereto a latched horizontal position; adjusting particular elements of the lower child seat 30 such as the adjustable seat brackets 37 and any other equipped adjustable features to desired positions based upon an anticipated position and size of an infant occupying the lower child seat 30; configuring the system 10 to receive an infant carrier 100 by placing the infant carrier 100 thereupon the carrier platform 50; securing the infant carrier 100 thereto an upper portion of the stroller frame 20 using the handle member portion 105 of the infant carrier 100 and a plurality of fastening means 51; loading one (1) or two (2) children/infants thereinto the system 10; utilizing the cup holder 62, upper tray 60, and accessory hook 64 as desired; transporting said children using the push handle 22 as needed; configuring the system 10 to facilitate a seated child thereupon by removing the infant carrier 100 therefrom the system 10 by detaching the fasteners 51 therefrom the handle member portion 105 of the infant carrier 100; installing the locking bar side padding 49 thereto the locking bars 28 using the hook-and-loop fasteners; utilizing the sitting platform 45 by loading a child thereinto a seated position facing a rearward direction; inserting the umbrella handle 40 thereinto an umbrella receptacle 25 to protect the children from weather elements; transporting said children using the push handle 22 as needed; and, benefiting from a configurable two-passenger stroller while enjoying the secure maneuverability of the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

The invention claimed is:

1. A stroller, further comprising:
   a collapsible folding tubular stroller frame assembly further comprising:
      an upper portion comprising:
         a pair of locking bars located along opposing outside upper members, each of said pair of locking bars comprises a pair of bars conjoined with a rotating fastener and an integral stop mechanism;
         a push handle extending generally horizontally from a rear upper portion of said upper portion;
         a sitting platform comprising a horizontal surface extending between and affixed to said opposing intermediate members in a forward and rearward direction along a horizontal plane affixed to said stroller frame;
         an adjustable upper seat belt harness and an upper harness buckle for securing an occupant in said sitting platform;
         a crotch strap affixed to a rearward upper member and a rearward location on said sitting platform;
         a carrier platform portion comprising a horizontal surface with a clearance means for said crotch strap extending between and affixed to said opposing upper members in a forward and rearward direction along a horizontal plane affixed to said stroller frame;

a lower portion pivotally attachable to said upper portion, further comprising:

a bumper bar comprising a U-shaped tubular member attached to and extending outwardly from a front portion of opposing lower members of said lower portion;

a lower tray affixed to upper surfaces of said bumper bar;

a lower child seat attachment means for said lower child seat; and, four wheel assemblies affixed to four outside lower corners of said opposing lower members of said lower portion;

a means for removably attaching an infant carrier thereto said stroller frame; and, an adjustable lower child seat attached thereto said stroller frame;

wherein said stroller can support and transport an occupant in said infant carrier and an occupant therein said lower child seat concurrently;

wherein an amount of personal items can be stored thereon said stroller;

wherein said stroller is collapsible therefrom a deployable state thereto a collapsed state;

wherein said pair of locking bars secures said stroller frame into said deployable state;

wherein said handle provides a means for a user to advance said stroller;

wherein said upper portion provides an upper carrier means for an occupant of said infant carrier;

wherein said sitting platform provides an upper sitting means for said occupant;

wherein said carrier platform provides a weight-bearing and support means for said infant carrier and occupant thereof;

wherein said lower tray forms a convenient horizontal table area;

wherein said four wheel assemblies provide a sufficient load-bearing capacity to support and transport a fully occupied stroller and personal items loaded thereon; and, wherein said collapsed state is achieved by pivoting said upper portion downward relative to said lower portion.

2. The stroller of claim 1, wherein said carrier platform further comprises a washable padded plastic covering.

3. The stroller of claim 2, wherein said carrier platform can be detached therefrom said rearward upper member and collected therearound a forward upper frame member and secured thereto to provide a rolled configuration thereof said carrier platform;

wherein said rolled configuration provides a safety barrier therebehind an occupant thereon said sitting platform; and, wherein said rolled configuration provides a means to convert said upper portion thetreto said upper sitting means for an occupant.

4. The stroller of claim 3, wherein said pair of locking bars each further comprise a removable padding.

5. The stroller of claim 1, wherein said push handle further comprises a U-shaped structure further comprising:

an upper tray affixed thereto opposing horizontal members thereof said push handle; and, a cup holder integral thereto said upper tray.

6. The stroller of claim 1, wherein said means for removably attaching said infant carrier thereto said stroller frame further comprises a plurality of fastening means to secure a handle thereof said infant carrier thereto said stroller frame.

7. The stroller of claim 1, wherein said adjustable lower child seat further comprises:

a pair of seat brackets comprising integral ear-shaped portions of opposing upper rear edge regions thereof said lower child seat and in mechanical communication therewith said lower child seat attachment means;

a pair of expansion sections located at intermediate positions along opposing side portions thereof said lower child seat; and, an adjustable lower seat belt harness and a lower harness buckle for securing an occupant therein said lower child seat;

wherein said adjustable lower child seat provides a reclining and adjustable back support means therefor an occupant therebetween an fully reclined position and a fully sitting position; and, wherein said pair of expansion sections provide for an expansion means therefor said lower child seat during said reclining and adjustable back support means.

8. The stroller of claim 7, wherein said lower child seat attachment means further comprises;

a plurality of adjustment apertures located therealong outer surfaces of opposing rearward lower members thereof said stroller frame;

a pair of adjusting pins located thereon each of said pair of seat brackets for correspondingly mating therewith one pair of adjustment apertures;

wherein said pair of adjusting pins secures said lower child seat thereat a particular reclined angle ranging from a sitting to a lying position in an expected manner when mating therewith said one pair of adjustment apertures.

9. The stroller of claim 8, wherein said lower child seat further comprises a washable padded surface.

10. The stroller of claim 8, wherein said pair of expansion sections further comprise expandable textile or rubber panels providing flexible regions.

11. The stroller of claim 1, wherein said four wheeled assemblies comprise:

a pair of front wheels each independently connected thereto forward lower members thereof said stroller frame;

a pair of rear wheels joined via a horizontal interconnecting metal wheel axle being affixed thereto at a center location of each rear wheel connected thereto rearward lower members thereof said stroller frame; and, an axle housing providing a tubular enclosure thereto said wheel axle affixed thereto opposing rearward lower members thereof said stroller frame.

12. The stroller of claim 11, wherein each of said pair of rear wheels and said pair of front wheels comprises a rubberized tread to provide a safe and smooth transportation of said stroller.

13. The stroller of claim 12, wherein said each rear wheel further comprises:

a brake pedal; and, a brake bracket attached thereto said axle adjacent thereto said each rear wheel and extending outwardly therefrom to provide a rotating attachment means thereto said brake pedal;

wherein a user provides a braking motion thereto said each rear wheel by toggling said brake pedal downward, so as to contact said brake pedal thereto a friction surface thereof said wheel axle; and, wherein a user releases said braking motion thereto said each rear wheel by toggling said brake pedal upward.

14. The stroller of claim 1, further comprising an upwardly extending umbrella receptacles located thereat a terminal end thereof opposing forward upper members for removably receiving an umbrella.

15. The stroller of claim 14, further comprising a pair of caps for removably inserting thereinto said umbrella receptacles.

16. The stroller of claim 1, further comprising at least one accessory hook affixed at a desired location thereon said stroller frame, thereby providing a secure attachment means therefore said personal items.

17. The stroller of claim 1, wherein said stroller frame comprises a rugged light-weight material.

\* \* \* \* \*